(12) United States Patent
Kim et al.

(10) Patent No.: US 7,218,357 B2
(45) Date of Patent: May 15, 2007

(54) PARALLEL STRUCTURE NTSC REJECTION FILTER AND FILTERING METHOD

(75) Inventors: Min-Ho Kim, Suwon (KR); Dong-Seog Han, Daegu Metropolitan (KR); Beom-Kon Kim, Daegu Metropolitan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 438 days.

(21) Appl. No.: 10/846,390

(22) Filed: May 13, 2004

(65) Prior Publication Data

US 2005/0012865 A1    Jan. 20, 2005

(30) Foreign Application Priority Data

Jul. 16, 2003    (KR) .................. 10-2003-0048651

(51) Int. Cl.
  *H04N 5/21*    (2006.01)
(52) U.S. Cl. .................. 348/607; 348/614; 348/21
(58) Field of Classification Search .............. 348/607, 348/21, 614, 624, 625, 630; 375/334, 335, 375/346–350; *H04N 5/21, 5/213*
See application file for complete search history.

(56) References Cited

U.S. PATENT DOCUMENTS 5,325,188 A    6/1994  Scarpa
5,452,015 A *  9/1995  Hulyalkar .................. 348/21
6,219,088 B1   4/2001  Liu et al.
6,344,871 B1 * 2/2002  Liu et al. .................. 348/21
6,727,936 B2 * 4/2004  Liu et al. .................. 348/21
6,744,474 B2 * 6/2004  Markman ................. 348/607

* cited by examiner

*Primary Examiner*—Sherrie Hsia
(74) *Attorney, Agent, or Firm*—Marger Johnson & McCollom, P.C.

(57) ABSTRACT

Method and apparatus for use with digital television receivers are included among the embodiments. In exemplary systems, components of an interfering analog television signal (e.g., an NTSC signal) in the same channel as a DTV signal are separately estimated and canceled from the DTV signal. For instance, separate frequency shifters produce shifted versions of the DTV signal, each shifter placing one interfering NTSC carrier signal at or near DC. A DC detector detects the NTSC carrier strength for each carrier, and carrier cancellation signals are synthesized based on these measured carrier strengths. This rejection filter is simpler than prior art filters that require phase-lock on the interfering carriers, and also allows the filter to operate when phase-lock on interfering carriers is difficult to obtain. Other embodiments are described and claimed.

16 Claims, 7 Drawing Sheets

PARALLEL STRUCTURE NTSC REJECTION FILTER AND FILTERING METHOD

RELATED APPLICATIONS

This application claims priority of Korean Patent Application No. 10-2003-0048651, filed Jul. 16, 2003, which is incorporated herein by reference in its entirety.

BACKGROUND OF THE INVENTION

1. Field of the Invention

The present invention relates to co-channel interference filtering for digital television signals, and more particularly to methods and apparatus for implementing a co-channel interference filter.

2. Description of the Related Art

Conventional broadcast television signals are strictly analog in nature. These conventional signals generally conform to one of three broadcast formats in wide adoption: the NTSC (National Television Standards Committee) format adopted in the United States and a few other countries, and the PAL (Phase Alternation by Line) and SECAM (Systeme Electronique Couleur Avec Memoire) formats adopted in most other countries.

High-Definition Television (HDTV), or more generally Digital Television (DTV), formats abandon the conventional analog television signal format in favor of a digitally coded signal. Due to the high redundancy found in most video signals, it is possible to digitally compress a video sequence in a manner that will be visually imperceptible (or mostly so) once uncompressed. Such DTV signals can therefore transmit much more detail than is possible with an equivalent analog signal of the same bandwidth. With the current HDTV format being implemented in the United States, HDTV bandwidth has been set to occupy roughly the same bandwidth as an analog NTSC broadcast, with channels assigned from the same channel space as NTSC channels.

Although the long-term plan is to phase out NTSC channels, the vast majority of television users do not yet own HDTV receivers and a complete switchover does not appear imminent. In the interim, television stations that broadcast an HDTV signal may have viewers that receive both the desired HDTV signal and a relatively strong but undesired NTSC signal on the same channel. In this circumstance, the NTSC and HDTV signals interfere with each other, producing what is known as "co-channel" interference.

Referring to FIG. 1, a frequency spectrum 100 of interfering HDTV and NTSC signals is depicted. Envelope 110 represents the HDTV information transmitted within the NTSC signal spectrum. NTSC Video carrier V, located 1.25 MHz from the lower edge of the allotted frequency spectrum, is used to demodulate the luminance component of the original NTSC signal. Color subcarrier C, located 3.58 MHz above video carrier V, is used to demodulate the quadrature chrominance signals in an NTSC color television receiver. Audio carrier A, located 4.5 MHz above the video carrier, is used to demodulate the frequency-modulated (FM) NTSC audio signal transmitted in a relatively small frequency band centered about carrier A. Other NTSC signal energy of a considerably lower magnitude is also distributed throughout the illustrated frequency space.

When an HDTV signal occupies the same channel space as an NTSC signal, the NTSC signal can produce strong interference. It is therefore desirable to pre-filter the received HDTV signal with an NTSC rejection filter that can remove predictable components of the NTSC signal, i.e., the video, color, and audio carriers. Typically, a comb filter is used as the NTSC rejection filter. As shown in FIG. 1, the comb filter 120 has nulls spaced 57 $f_H$ Hz apart, where $f_H$ is the horizontal scan frequency of the analog video signal (15.734 kHz for NTSC video). One comb filter null aligns approximately with the video carrier V, another comb filter null aligns approximately with the color subcarrier C, and a third comb filter null aligns approximately with the audio carrier A.

From FIG. 1, it can be appreciated that the comb filter nulls are relatively wide, and the comb filter contains other nulls within the HDTV channel space that in all likelihood will not improve co-channel interference. In fact, the NTSC rejection filter degrades the signal-to-noise ratio (SNR) of the HDTV signal by approximately 3 dB when no NTSC signal is present. Therefore, an NTSC rejection filter that effectively filters NTSC carrier energy, without overly reducing the HDTV signal energy, would be preferred if such a filter could be implemented without undue complexity.

U.S. Pat. No. 5,325,188, entitled "Apparatus For NTSC Signal Interference Cancellation Through the Use of Digital Recursive Notch Filters" and issued to Scarpa, describes one type of filter for eliminating interfering V, C, and A NTSC carriers from an HDTV signal. As shown in FIG. 2, this patent describes an HDTV receiver 200 that uses separate digital recursive notch filters, i.e. a bi-quadratic filters, for each carrier component. An HDTV signal with NTSC interference is received at tuner 202, which rejects out-of-band signals and downconverts the desired signal to an intermediate frequency (IF). An analog-to-digital converter (ADC) 204 digitizes the IF signal, and supplies the digitized signal to one input of an adder 206 and to three bi-quadratic filters 210, 220, and 230. Each bi-quadratic filter filters all components of the input signal except for a narrow band around a frequency that the filter is tracking. The outputs of filters 210, 220, and 230 are subtracted from the digitized IF signal at adder 206, and the adder output is supplied to HDTV demodulator 240 for further processing.

Referring to graph 300 shown in FIG. 3, line 310 represents the intended frequency response observed at the output of adder 206. Each of filters 210, 220, and 230 produces a respective notch at one of the V, C, and A frequencies of potential NTSC interference. Although this response characteristic is considerably more selective to NTSC carriers than the comb filter frequency response characteristic 120 shown in FIG. 1, the bi-quadratic filters involve substantial computational complexity. Furthermore, each filter relies on an ability to obtain phase lock on an NTSC carrier of interest, which may be difficult when NTSC interference exists but does not contain a particularly strong carrier signal.

U.S. Pat. No. 6,219,088, entitled "NTSC Interference Rejection Filter" and issued to Liu et al., describes a different approach to NTSC carrier cancellation. The '088 patent describes an in-line NTSC filter 400 as shown in FIG. 4. Filter 400 uses three serial filter stages 410, 420, and 430 to respectively cancel NTSC video, color, and audio carrier signals. Each stage contains a frequency shifter (412, 422, and 432) and a DC cancel circuit (414, 424, and 434). Frequency shifter 412 shifts a basebanded HDTV signal spectrum to place the video carrier V at DC, and then DC cancel circuit 414 cancels that component. The output of DC cancel circuit 414 is supplied to frequency shifter 422, which shifts the signal spectrum to place the color subcarrier C at DC. DC cancel circuit 524 then cancels the color subcarrier component and supplies its output to frequency shifter 432.

Frequency shifter 432 shifts the signal spectrum to place the audio carrier at DC, and then DC cancel circuit 534 cancels the audio carrier component. Finally, the frequency shifter 440 takes the output of DC cancel circuit 434 and removes the previous three shifts, thereby restoring the signal back to baseband.

Filter 400 is problematic in several respects. First, the desired components of the input signal pass through four frequency shifters and three filters, thereby adding magnitude and phase errors to the signal. Also, this filter does not account for lower sideband NTSC signal energy that is restored when the input signal is basebanded, and does not cancel this energy. The repeated frequency shifts by less than the width of the signal spectrum also shift the HDTV sidebands in an interfering manner, thus scrambling the desired HDTV signal.

SUMMARY

In an embodiment, signals present at an input are separately estimated at multiple frequencies of potential interference, i.e., NTSC carrier frequencies. The estimated interfering signals are then subtracted from a desired signal. As opposed to conventional approaches that require phase locking circuits and complex filters, the preferred and novel embodiments may simply utilize a simple DC estimator or lowpass filter to synthesize a cancellation signal.

In an embodiment, a frequency shifter may contain a separate frequency-shifter block for each frequency at which signal strength is to be estimated. Three such frequency-shifter blocks may be used, one each for the video, color, and audio carrier frequencies. Each frequency-shifter block may receive the input signal, which may be an IF-modulated and sampled input HDTV signal. Each frequency-shifter block may shift the input signal by a predetermined frequency.

In the embodiment, a DC detector detects the DC components of the signals output by frequency-shifter blocks. The DC detector may contain three lowpass filters, one each for the video, color, and audio carrier frequencies. The lowpass filters may receive the output of the respective frequency-shifter blocks in the frequency shifter and estimate the DC signal strength in that signal to obtain an estimate of the video, color, and audio carrier strengths, respectively.

Also in the embodiment, an interference signal synthesizer synthesizes video, color, and audio carrier signals based on the output of DC detector. For instance, the signal synthesizer can contain three frequency synthesizers, one each for the video, color, and audio.

Adders may remove the estimated interference signals from the input signal. For example, an adder may add or subtract concurrent samples from the three frequency synthesizers, appropriately delayed to produce an in-phase interference signal cancellation.

In other embodiments, more or less than three frequencies can be selected for cancellation by including a different number of frequency-cancel paths in the filter.

DETAILED DESCRIPTION OF THE EMBODIMENTS

The present invention includes embodiments that separately estimate the signal present at multiple frequencies of potential interference, i.e., NTSC carrier frequencies, and subtracts those estimated interfering signals from a desired signal. As opposed to prior art approaches that require phase locking circuits and complex filters, the preferred embodiments utilize a simple DC estimator or lowpass filter to synthesize a cancellation signal.

Figure 1:
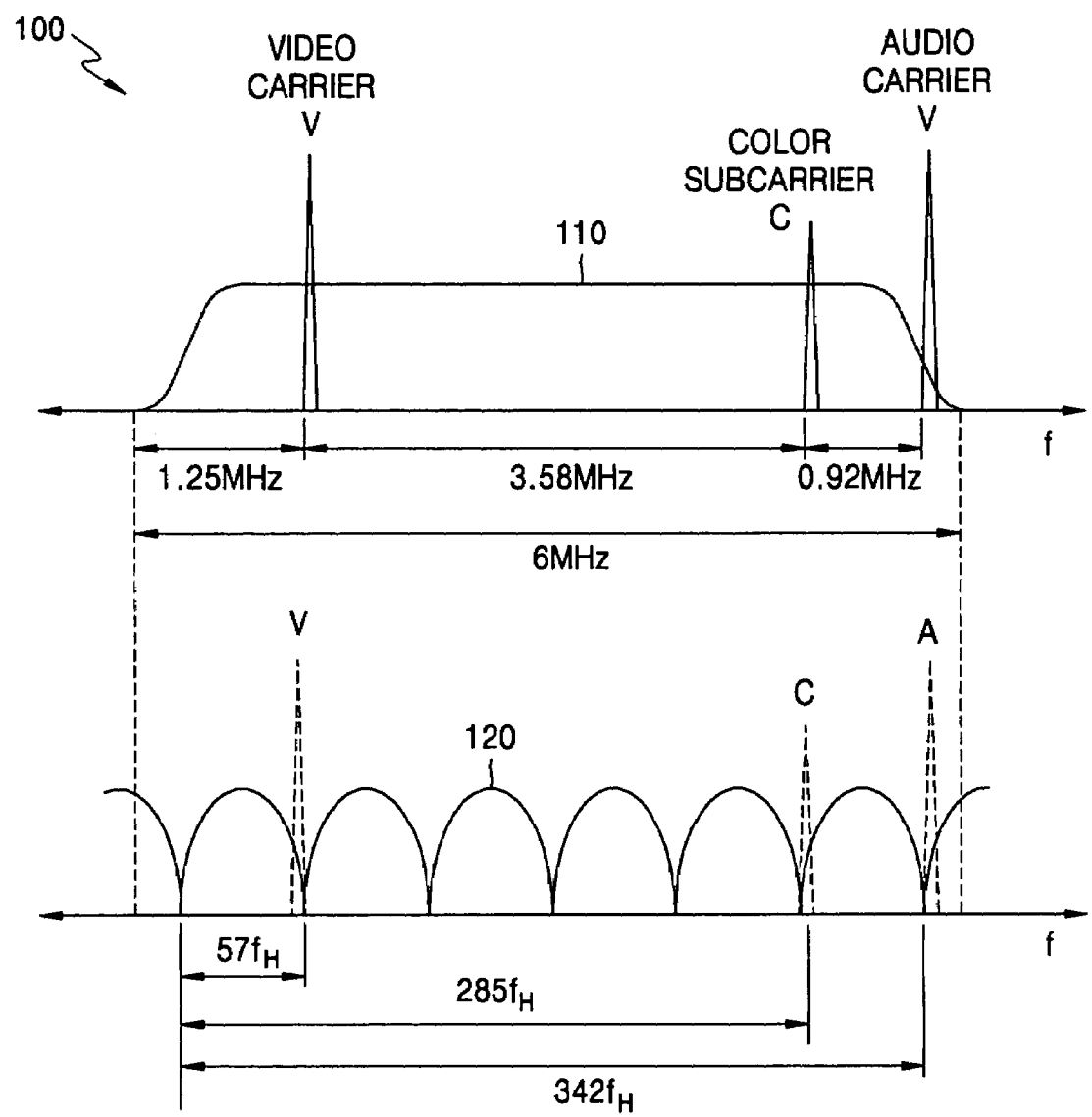
FIG. 1 illustrates the frequency spectrum of an HDTV signal with an interfering NTSC television signal, and shows how that spectrum aligns with a comb filter used for NTSC signal rejection.
Figure 2:
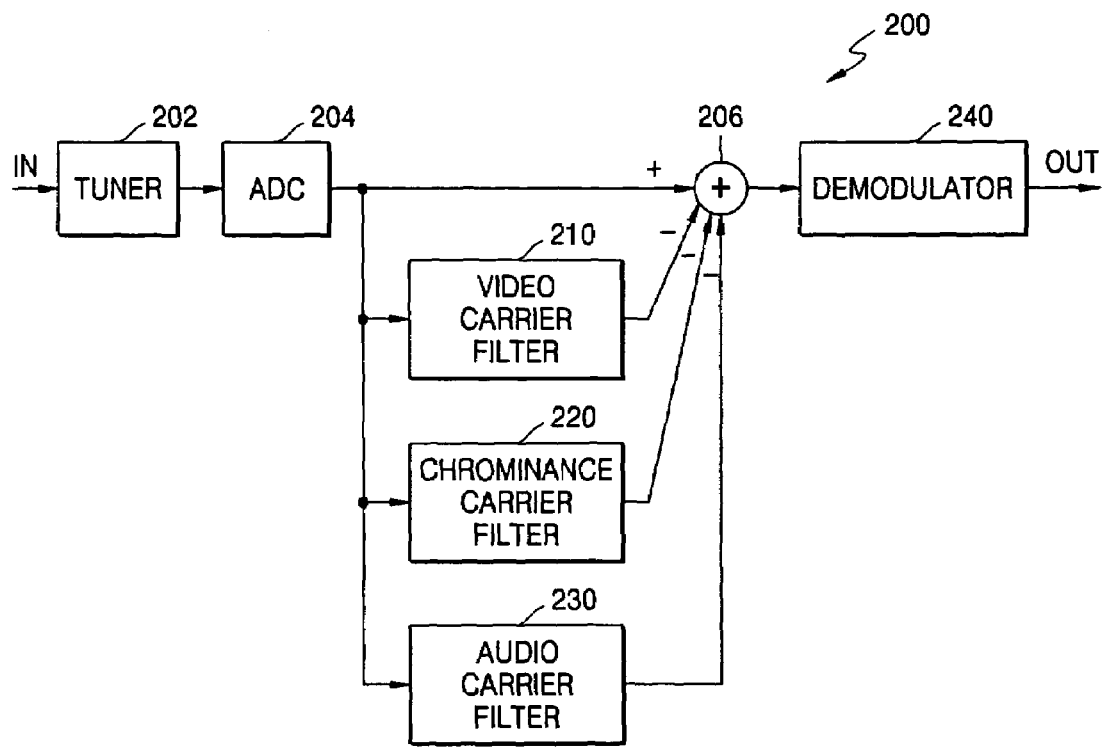
FIG. 2 depicts a prior art HDTV receiver that uses parallel bi-quadratic filters to remove NTSC interference.
Figure 3:
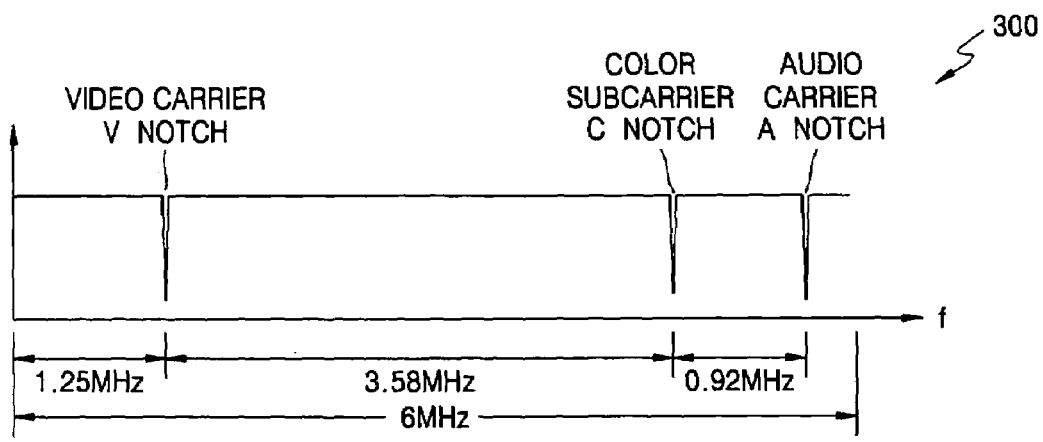
FIG. 3 shows the intended frequency response of the filtering scheme shown in FIG. 2.
Figure 4:
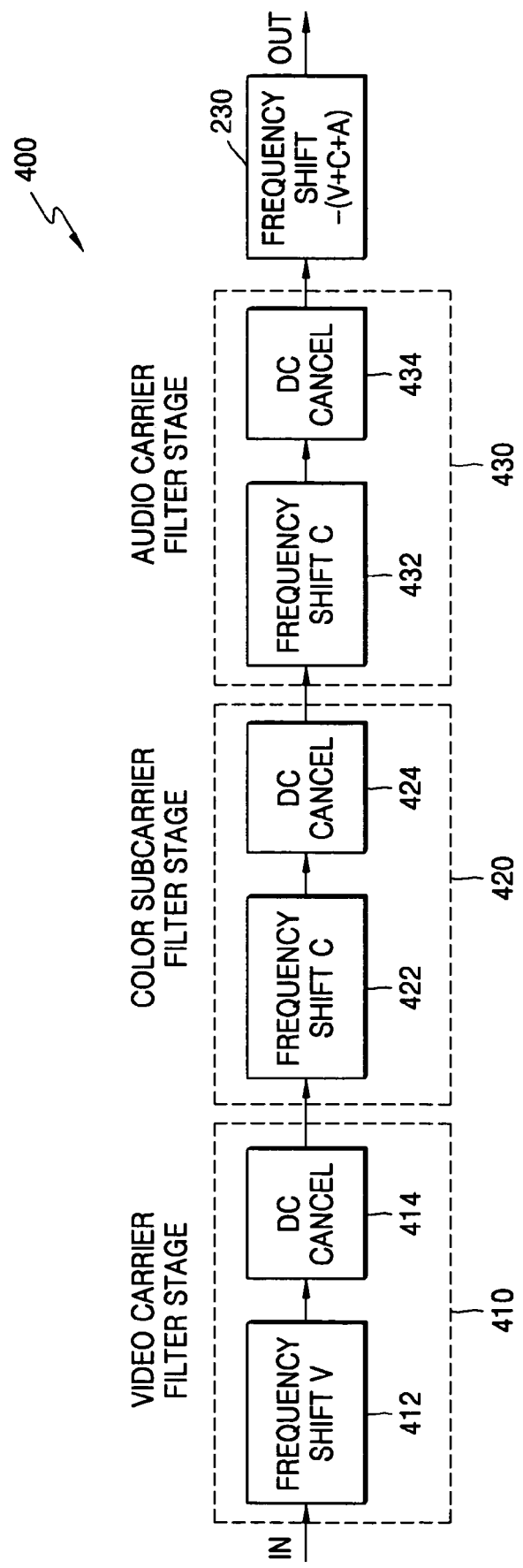
FIG. 4 depicts a prior art NTSC filter that uses multiple serial frequency-shift/DC cancel stages to cancel NTSC interference.
Figure 5:
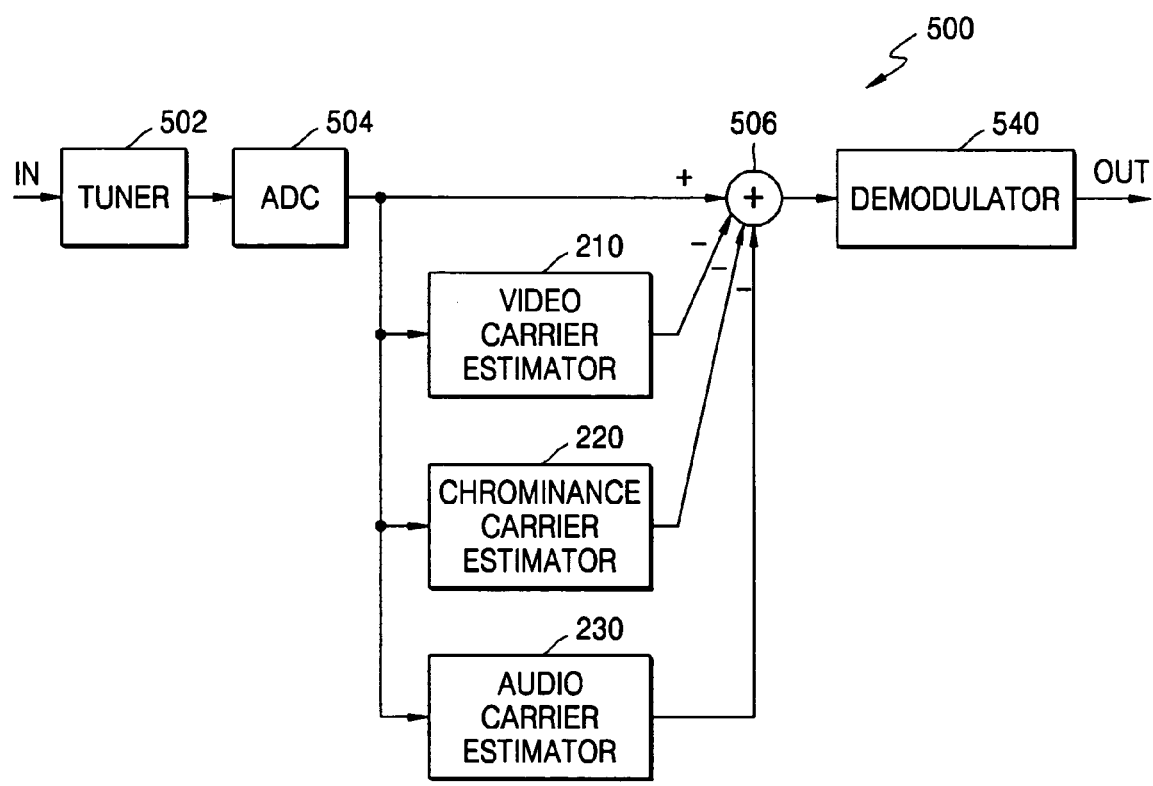
FIG. 5 contains a block diagram for an HDTV receiver containing an NTSC rejection filter according to some embodiments of the present invention.

FIG. 5 shows a general block diagram of a DTV receiver 500 incorporating an embodiment of the present invention. An HDTV signal with potential NTSC interference is received at tuner 502, which rejects out-of-band signals and downconverts the desired signal to IF. An ADC 504 digitizes the IF signal, and supplies the digitized signal to one input of an adder 506 and to three carrier estimators 510, 520, and 530. The outputs of estimators 510, 520, and 530 are subtracted from the digitized IF signal at adder 506, and the adder output is supplied to HDTV demodulator 540 for further processing.

Figure 6:
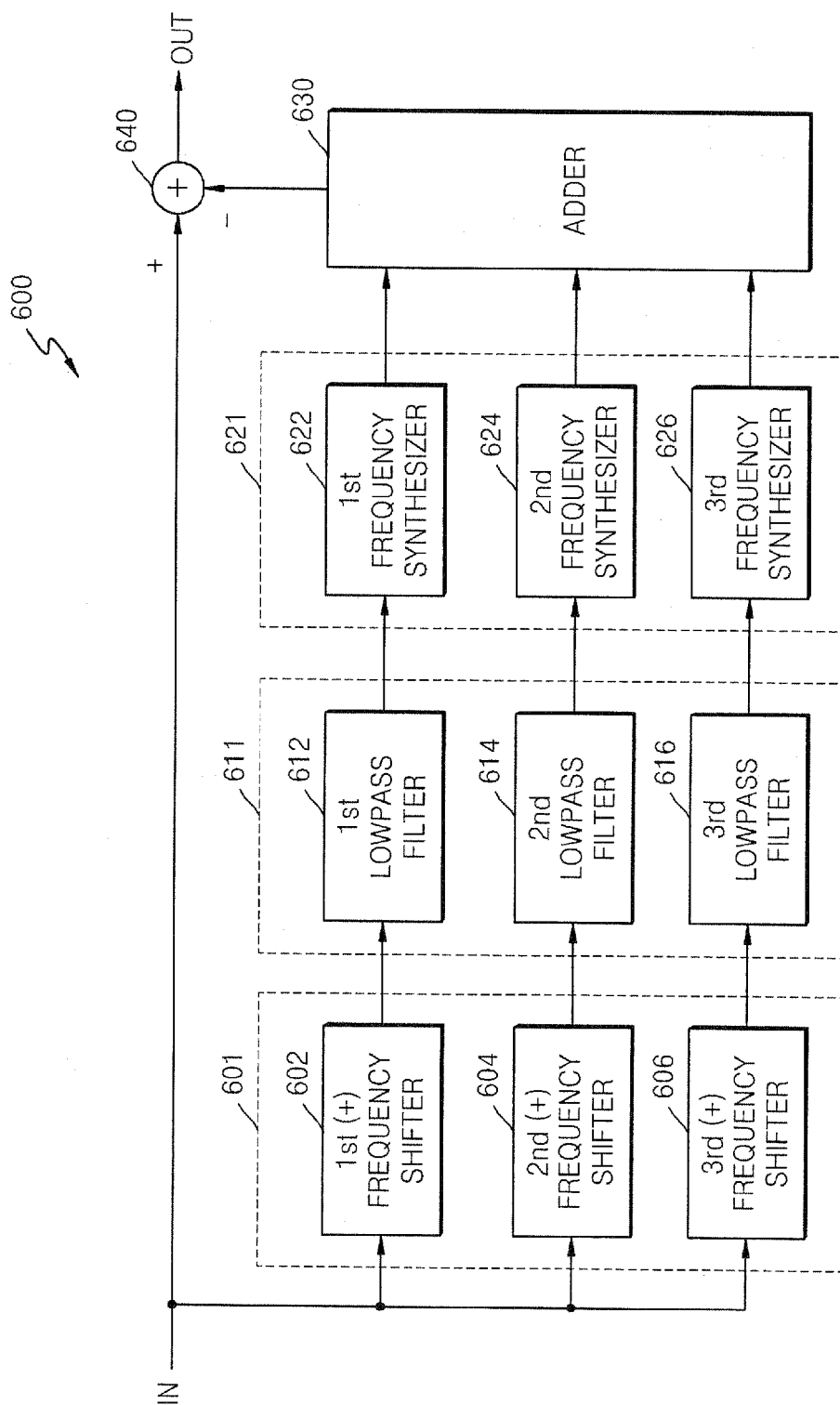
FIG. 6 contains a more detailed block diagram for an NTSC rejection filter according to some embodiments of the present invention.

FIG. 6 shows further detail for one embodiment of an NTSC signal rejection filter 600 according to the present invention. Filter 600 comprises a frequency shifter 601, a DC detector 611, an interference signal synthesizer 621, and adders 630 and 640. Each component will be described in turn.

Frequency shifter 601 contains a separate frequency-shifter block for each frequency at which signal strength is to be estimated. In FIG. 6, three such frequency-shifter blocks 602, 604, and 606 are used, one each for the video, color, and audio carrier frequencies. Each frequency-shifter block receives the input signal, e.g., an IF-modulated and sampled input HDTV signal.

Each frequency-shifter block shifts the input signal by a predetermined frequency. For instance, if the input signal is modulated at a center frequency IF MHz, frequency-shifter block 602 can downshift the signal by (IF−1.75) MHz to place the video carrier V at DC, frequency-shifter block 604 can downshift the signal by (IF+1.83) MHz to place the color subcarrier C at DC, and frequency-shifter block 606 can downshift the signal by (IF+2.75) MHz to place the audio carrier A at DC.

DC detector 611 detects the DC components of the signals output by frequency-shifter blocks 602, 604, and 606. To that end, DC detector 611 contains three lowpass filters 612, 614, and 616, one each for the video, color, and audio carrier frequencies. Lowpass filter 612 receives the output of frequency-shifter block 602 and estimates the DC signal strength in that signal to obtain an estimate of the video carrier V strength. Lowpass filter 614 receives the output of frequency-shifter block 604 and estimates the DC signal strength in that signal to obtain an estimate of the color subcarrier C strength. Lowpass filter 616 receives the output of frequency-shifter block 606 and estimates the DC signal strength in that signal to obtain an estimate of the audio carrier strength.

Interference signal synthesizer 621 synthesizes video, color, and audio carrier signals based on the output of DC detector 611. For instance, signal synthesizer 621 can contain three frequency synthesizers 622, 624, and 626 to respectively receive the DC values detected by lowpass filters 612, 614, and 616 and create digital signals at the appropriate frequencies, amplitudes, and phases. When frequency-shifter blocks 602, 604, and 606 shift the input signal respectively by (IF−1.75) MHz, (IF+1.83) MHz, and (IF+2.75) MHz, these same frequencies are used to synthesize the interference signals.

Adders 630 and 640 operate to remove the estimated interference signals from the input signal. Adder 630 adds concurrent samples from the three frequency synthesizers, and adder 640 subtracts the output of adder 630 from the input signal, appropriately delayed to produce an in-phase interference signal cancellation.

Figure 7:
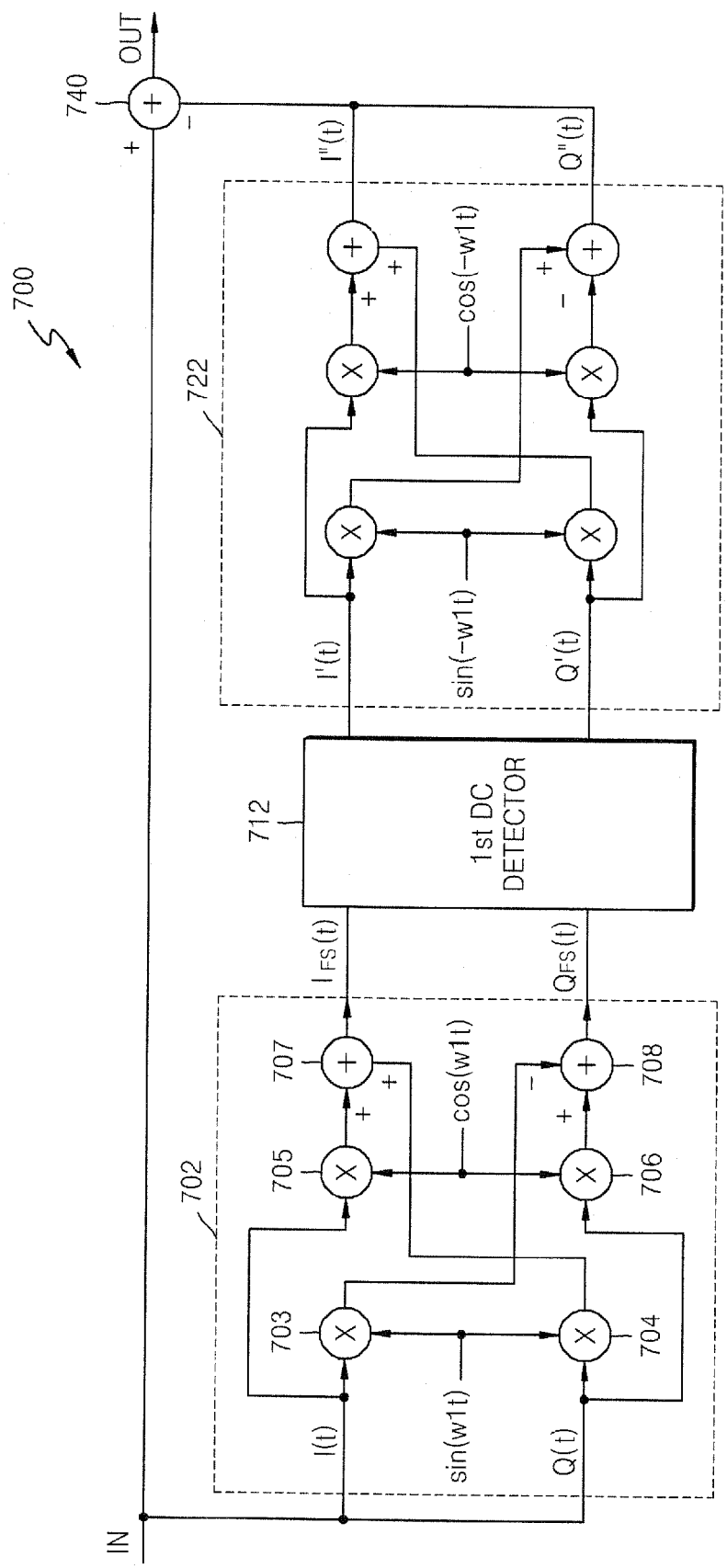
FIG. 7 shows a detailed implementation for one carrier estimator component of an embodiment of the present invention.

Although the embodiments shown in FIGS. 5 and 6 cancel three NTSC carriers, more or less than three frequencies can be selected for cancellation by including a different number of frequency-cancel paths in the filter. FIG. 7 shows the basic elements for a single frequency-cancel filter 700 according to some embodiments of the present invention. Multiple blocks similar to filter 700 can be implemented, e.g., in the configurations of FIGS. 5 and 6, to provide parallel cancellation of multiple frequencies.

Filter 700 comprises a frequency shifter 702, a DC detector 712, an interference signal synthesizer 722, and an adder 740. Each will be described in turn.

Frequency shifter 702 comprises a complex multiplier, consisting of scalar multipliers 703, 704, 705, and 706, and scalar adders 707 and 708. Input signal samples are provided to frequency shifter 702 as a quadrature-sampled data stream, consisting of in-phase samples I(t) and quadrature-phase samples Q(t). Complex samples of a shifting signal $e^{-j\omega t}$, where ω is the frequency shift required to shift a desired frequency component of the input signal to DC, are also provided to frequency shifter 702, e.g., in a format cos(ωt)−j sin(ωt). The shifting signal may be provided from a lookup table, generated explicitly given a desired value ω, or selected by other known means.

Frequency shifter 702 multiplies these two complex sample streams together. For instance, the illustrated embodiment forms a frequency-shifted output signal having an in-phase frequency-shifted component $I_{FS}(t)=I(t)\cos(\omega t)+Q(t)\sin(\omega t)$ and a quadrature-phase frequency-shifted component $Q_{FS}(t)=Q(t)\cos(\omega t)-I(t)\sin(\omega t)$.

DC detector 712 separately measures the signal strength of $I_{FS}(t)$ and $Q_{FS}(t)$, e.g., by one of several possible methods to be explained shortly. The signal strength measurements are output from DC detector 712 as in-phase magnitude I'(t) and quadrature-phase magnitude Q'(t).

Interference signal synthesizer 722 can be implemented in many different ways, one of which is depicted in FIG. 7. In FIG. 7, synthesizer 722 contains a complex multiplier like the complex multiplier used in frequency shifter 702. One input to synthesizer 722 is the DC-magnitude pair I'(t), Q'(t), and the other input is a complex shifting signal $e^{j\omega t}$, e.g., provided in a format cos(ωt)+j sin(ωt). Synthesizer 722 multiplies these two inputs together to produce a properly phased and amplitude-scaled signal that approximates the signal existing in the input spectrum at frequency ω, consisting of an in-phase cancellation signal $I''(t)=I'(t)\cos(\omega t)-Q'(t)\sin(\omega t)$ and a quadrature-phase frequency-shifted component $Q''(t)=Q'(t)\cos(\omega t)+I'(t)\sin(\omega t)$.

Adder 740 performs a complex subtraction of the cancellation signal from the input signal. Of course, the quadrature-phase cancellation need not be performed unless the quadrature-phase samples will be needed in downstream processing.

Figure 8:
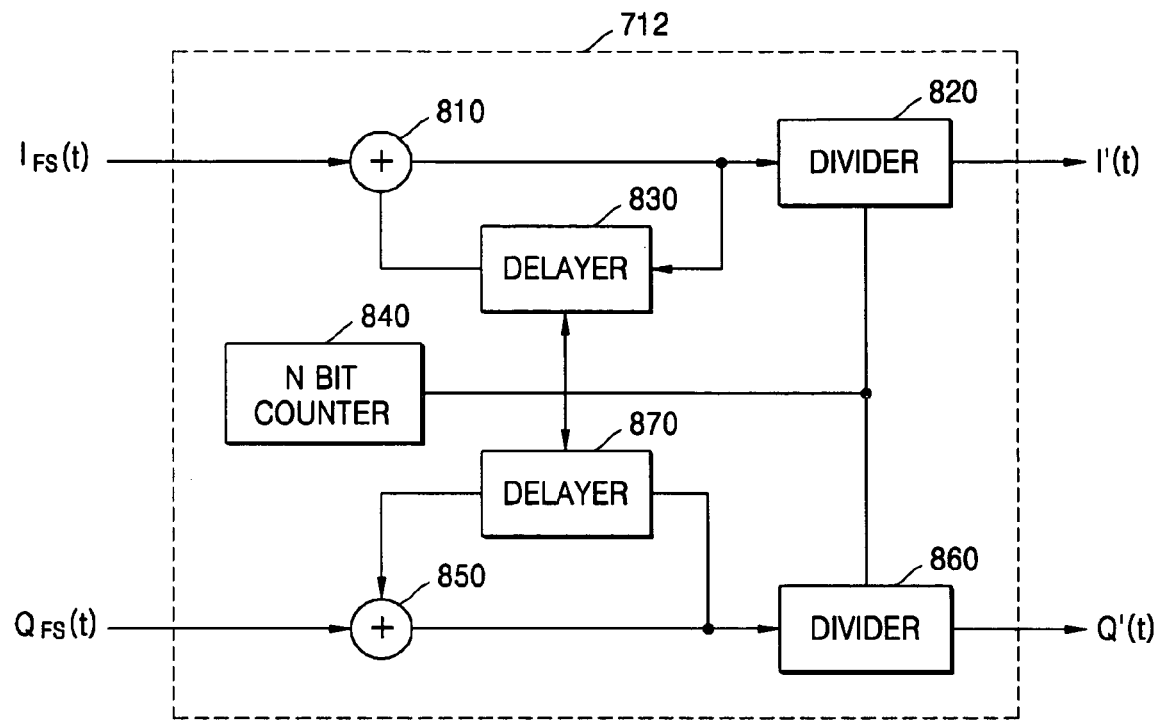
FIG. 8 shows a detailed implementation for a DC detector useful in some embodiments of the present invention.

As mentioned above, DC detector 712 can be implemented in a variety of different ways, depending on the desired effect. FIG. 8 shows one possible implementation of DC detector 712, consisting of adders 810 and 850, dividers 820 and 860, delay elements 830 and 870, and a counter 840.

Considering the in-phase path, adder 810 adds the current sample of $I_{FS}(t)$ to the output of delay element 830. The output of adder 810 is supplied as the input to delay element 830 and divider 820. Counter 840 is preset to count up to a desired number of samples, at which time counter 840 resets itself, resets delay element 830, and causes divider 820 to divide its input by the number of samples preset in counter 840. Divider 820 holds the value calculated as I'(t), and outputs this value until the next signal is received from counter 840. The quadrature-phase path operates in an identical fashion to the in-phase path to calculate Q'(t) from samples $Q_{FS}(t)$.

Those skilled in the art will recognize that this DC detector operates as a block lowpass filter with a bandwidth that can be varied by changing the counter value. In other words, shorter averaging intervals allows the DC detector to follow a wider band of frequencies centered about DC, as well as follow faster variations in the magnitude of the DC signal. Longer averaging intervals narrow the response of the DC detector. Note that it is also possible to run the DC detector (and frequency shifter) intermittently, with divider 820 holding its value whenever a new DC value is not being measured. Although a delay in the primary DTV signal path is not shown in FIG. 7, an appropriate delay can be used such that the block DC value that is calculated is applied to the same input samples for which it was calculated. Also, slightly more complex circuitry can be used to produce overlapping block averages.

Figure 9:
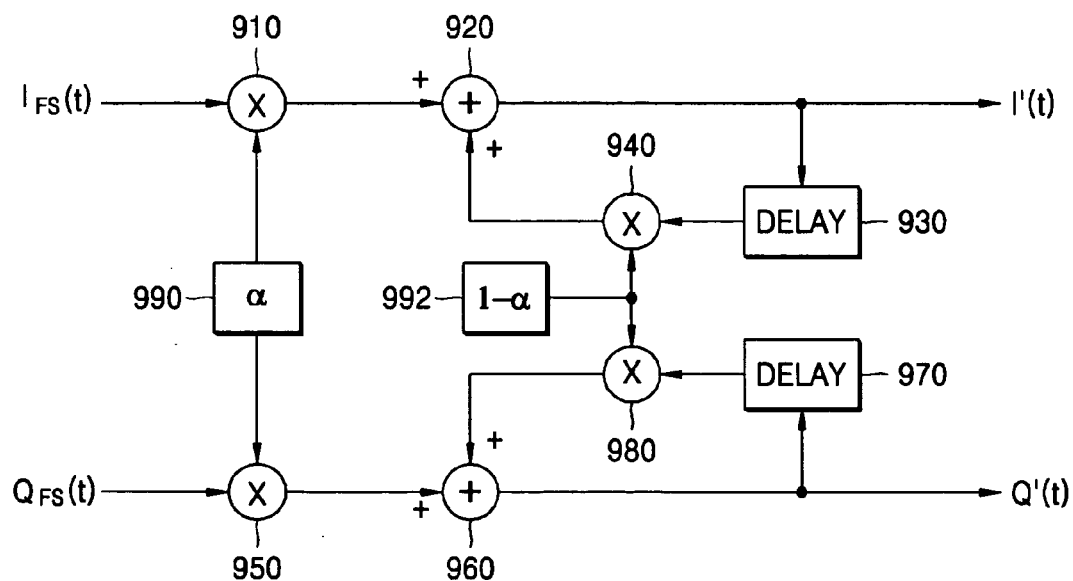
FIG. 9 illustrates a DC detector having a jitter canceller capability.

FIG. 9 shows an alternate implementation for a DC detector 912 that provides jitter cancellation, e.g., by calculating a sliding mean instead of using block measurements as in the embodiment above. DC detector 912 comprises multipliers 910, 940, 950, and 980, adders 920 and 960, delay elements 930 and 970, and parameter registers 990 and 992.

The response characteristics of DC detector 912 are adjustable based on a parameter α, where 0<α<1. Parameter register 990 holds the value α, and parameter register 992 holds the value 1−α.

Considering the in-phase path, multiplier 910 multiplies the current sample of $I_{FS}(t)$ by the value of parameter register 990, and supplies its output to one input of adder 920. Multiplier 940 multiplies the output of delay element 930 by the value of parameter register 992, and supplies its output to the other input of adder 920. The output of adder 920 forms the input to delay element 930, and also forms the DC detector output I'(t). The quadrature-phase path operates in an identical fashion to the in-phase path to calculate Q'(t) from samples $Q_{FS}(t)$.

Those skilled in the art will recognize that the bandwidth of this DC detector can be varied by changing the parameter α. In other words, larger values of a allow the DC detector to follow a wider band of frequencies centered about DC, as well as follow faster variations in the magnitude of the DC signal. Smaller values of a narrow the response of the DC detector, but also reduce its susceptibility to noise and adjacent signals. Although a delay in the primary DTV signal path is not shown in FIG. 7, an appropriate delay can be used such that the delay induced by the parameter α is at least partially reflected in the timing of the input signal with respect to the synthesized interference cancellation signals.

Many alternate implementations exist for the exemplary components described herein. For instance, the DC detector can output a magnitude and phase instead of separate in-phase and quadrature-phase signals, and the interference signal synthesizer can use the phase to index samples from a lookup table.

From the above description, it is apparent that the term "DC" as used herein encompasses a band of frequencies that includes true DC but may also include other frequencies in a band about DC. A particular system design may use different values for this DC band, from a few Hz or tens of Hz wide to many kHz wide in some implementations. The DC bandwidth and/or shift frequencies may also be adjustable in some systems. Those skilled in the art will recognize that although NTSC interference has been described, the invention is useful for removing other types of narrowband interference from a DTV signal.

Those skilled in the art will recognize that many other device configuration permutations can be envisioned and many design parameters have not been discussed. Likewise, functionality shown embodied in a single functional block may be implemented using multiple cooperating circuits or blocks, or vice versa. The particular filter components discussed can be implemented in an integrated circuit, programmed in a digital processor, or implemented using some combination of these approaches. Such minor modifications and implementation details are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. An NTSC rejection filter comprising:
    a frequency shifter to shift the spectrum of a digital television (DTV) input signal, respectively, by a video carrier frequency offset, a color subcarrier frequency offset, and an audio carrier frequency offset, thereby creating a video carrier basebanded signal, a color subcarrier basebanded signal, and an audio carrier basebanded signal;
    a lowpass filter to estimate video carrier signal strength, color subcarrier signal strength, and audio carrier signal strength, respectively, from the video carrier basebanded signal, the color subcarrier basebanded signal, and the audio carrier basebanded signal;
    an interference signal synthesizer to create video carrier, color subcarrier, and audio carrier interference rejection signals, based respectively on the estimated video carrier, color carrier, and audio carrier signal strengths; and
    an adder to subtract the video carrier, color subcarrier, and audio carrier interference rejection signals from the DTV input signal.

2. The NTSC rejection filter of claim 1, wherein each basebanded signal is a complex signal, and wherein the lowpass filter estimates each signal strength as a complex value.

3. The NTSC rejection filter of claim 2, wherein the interference signal synthesizer comprises a second frequency shifter:
    to modulate the video carrier signal strength by the negative of the video carrier frequency offset to create the video carrier interference rejection signal;
    to modulate the color subcarrier signal strength by the negative of the color subcarrier frequency offset to create the color subcarrier interference rejection signal; and
    to modulate the audio carrier signal strength by the negative of the audio carrier frequency offset to create the audio carrier interference rejection signal.

4. The NTSC rejection filter of claim 2, further comprising a jitter compensator to compensate for jitter in the estimated signal strengths prior to the use of those signal strengths in the interference signal synthesizer.

5. The NTSC rejection filter of claim 4, wherein the jitter compensator comprises an exponential filter.

6. The NTSC rejection filter of claim 2, wherein the lowpass filter comprises an adder to sum samples over a time period, respectively, from each of the basebanded signals, and a divider to average the respective sample sums to create the estimated signal strengths.

7. An interference rejection filter comprising:
    a first frequency shifter to shift the spectrum of an input signal by a first frequency to create a first frequency-shifted input signal;
    a first lowpass filter to estimate the DC value of the first frequency-shifted input signal;
    a first interference signal synthesizer to create a first interference rejection signal, at the first frequency, based on the estimated DC value; and
    an adder to subtract the first interference rejection signal from the input signal.

8. The interference rejection filter of claim 7, further comprising:
    a second frequency shifter to shift the spectrum of the input signal by a second frequency to create a second frequency-shifted input signal;
    a second lowpass filter to estimate the DC value of the second frequency-shifted input signal; and
    a second interference signal synthesizer to create a second interference rejection signal, at the second frequency, based on the estimated DC value, wherein the adder also subtracts the second interference rejection signal from the input signal.

9. A method of filtering interference at a known frequency from a digital television (DTV) signal, the method comprising:
    frequency shifting the DTV signal to shift the known frequency to baseband;
    estimating the DC value of the frequency-shifted DTV signal;

creating an interference rejection signal at the known frequency based on the estimated DC value; and subtracting the interference rejection signal from the original DTV signal.

10. The method of claim 9, wherein creating an interference rejection signal comprises frequency shifting the estimated DC value by the negative of the frequency shift used to shift the DTV signal.

11. The method of claim 9, wherein estimating the DC value of the frequency-shifted DTV signal comprises averaging a known number of consecutive samples from the frequency-shifted DTV signal.

12. The method of claim 11, wherein the samples from the frequency-shifted DTV signal are complex samples including in-phase and quadrature-phase samples, and wherein averaging a known number of consecutive samples comprises separately averaging the in-phase and quadrature-phase samples.

13. The method of claim 9, wherein estimating the DC value of the frequency-shifted DTV signal comprises exponentially filtering samples from the frequency-shifted DTV signal.

14. The method of claim 9, applied three times in parallel to the DTV signal for three known frequencies, wherein the three known frequencies correspond to NTSC video carrier, color subcarrier, and audio carrier frequencies in the DTV signal channel.

15. A digital television (DTV) receiver having an NTSC rejection filter comprising:
a frequency shifter to shift the spectrum of a DTV input signal, respectively, by a video carrier frequency offset, a color subcarrier frequency offset, and an audio carrier frequency offset, thereby creating a video carrier basebanded signal, a color subcarrier basebanded signal, and an audio carrier basebanded signal;
a lowpass filter to estimate video carrier signal strength, color subcarrier signal strength, and audio carrier signal strength, respectively, from the video carrier basebanded signal, the color subcarrier basebanded signal, and the audio carrier basebanded signal;
an interference signal synthesizer to create video carrier, color subcarrier, and audio carrier interference rejection signals, based respectively on the estimated video carrier, color subcarrier, and audio carrier signal strengths; and
an adder to subtract the video carrier, color subcarrier, and audio carrier interference rejection signals from the DTV input signal.

16. An integrated circuit to process a digital television (DTV) signal, the integrated circuit comprising: first, second, and third digital frequency shifters operating on in-phase and quadrature-phase digital samples of the DTV signal to shift the spectrum of the DTV signal, respectively, by a video carrier frequency offset, a color subcarrier frequency offset, and an audio carrier frequency offset, thereby creating a video carrier basebanded complex sample stream, a color subcarrier basebanded complex sample stream, and an audio carrier basebanded complex sample stream;
first, second, and third digital lowpass filters to calculate video carrier signal strength, color subcarrier signal strength, and audio carrier signal strength estimates, respectively, from the video carrier, the color subcarrier, and the audio carrier basebanded complex sample streams;
fourth, fifth, and sixth digital frequency shifters to shift the video carrier signal strength, color subcarrier signal strength, and audio carrier signal strength estimates, respectively, by the negative of the video carrier frequency offset, the negative of the color subcarrier frequency offset, and the negative of the audio carrier frequency offset, thereby respectively creating video carrier, color subcarrier, and audio carrier interference rejection sample streams; and
an adder to subtract the video carrier, color subcarrier, and audio carrier interference rejection sample streams from the DTV signal.

* * * * *